US005188900A

United States Patent [19]

Revis et al.

[11] Patent Number: 5,188,900

[45] Date of Patent: Feb. 23, 1993

[54] SUBSTRATES HAVING AN ABRASION-RESISTANT COATING FORMED THEREON

[75] Inventors: Anthony Revis, Saginaw County; Levi J. Cottington, Midland County, both of Mich.

[73] Assignee: Dow Corning Corporation, Midland, Mich.

[21] Appl. No.: 862,384

[22] Filed: Apr. 2, 1992

Related U.S. Application Data

[62] Division of Ser. No. 423,159, Oct. 18, 1989, Pat. No. 5,126,394.

[51] Int. Cl.[5] .............................................. B32B 27/36

[52] U.S. Cl. .................................... 428/412; 428/483; 428/520

[58] Field of Search ........................ 428/412, 483, 520

[56] References Cited

U.S. PATENT DOCUMENTS

| | | | |
|---|---|---|---|
| 3,986,997 | 10/1976 | Clark . | |
| 4,309,319 | 1/1982 | Vaughn, Jr. . | |
| 4,314,932 | 2/1982 | Wakimoto | 524/493 |
| 4,348,462 | 9/1982 | Chung | 428/412 |
| 4,436,851 | 3/1984 | Vaughn, Jr. | 524/43 |
| 4,455,205 | 6/1984 | Olson et al. . | |
| 4,486,504 | 12/1984 | Chung | 428/412 |
| 4,575,473 | 3/1986 | Domeier | 428/290 |
| 4,719,146 | 1/1988 | Hohuge | 428/331 |
| 4,963,601 | 10/1990 | Shibato | 523/339 |

*Primary Examiner*—Christopher Henderson
*Attorney, Agent, or Firm*—Arne R. Jarnholm

[57] ABSTRACT

The present invention relates to coating compositions containing multifunctional acrylate monomers, acrylic monomers and colloidal silica. Silanes are absent from these coating compositions. Transparent, abrasion resistant coatings result from the cure, either by ultraviolet light or electron beam radiation, of these compositions.

5 Claims, No Drawings

SUBSTRATES HAVING AN ABRASION-RESISTANT COATING FORMED THEREON

This application is a division of patent application Ser. No. 07/423,159, filed Oct. 18, 1989, now U.S. Pat. No. 5,126,394.

BACKGROUND OF THE INVENTION

This invention relates to a radiation curable protective coating composition. More specifically, it relates to a silane free coating composition which, when applied to a substrate and radiation cured, forms a protective, abrasion resistant, weather resistant, ultraviolet light resistant, transparent coating firmly held thereon. In addition, substrates coated with this composition may be tinted and/or dyed. Current markets for such coatings are well established and will expand as the abrasion resistance and weatherability of these coatings is improved.

The use of silanes as major components in abrasion resistant coating compositions is well known. For example, U.S. Pat. No. 3,986,997, issued Oct. 19, 1976, and assigned to Dow Corning Corporation, Midland, MI., and U.S. Pat. Nos. 4,309,319 issued Jan. 5, 1982, and 4,436,851 issued Mar. 13, 1984, and assigned to General Electric Company, Waterford, N.Y., describe thermally cured abrasion resistant coatings formed from mixtures of colloidal silica and alkoxy silanes.

Later, acrylates were introduced into abrasion resistant coating compositions, to allow such compositions to be radiation cured. The introduction of acrylates necessitated the replacement of the alkoxy silanes used in the thermally cured compositions with silanes capable of reacting with acrylates such as acryloxy and/or glycidoxy functional silanes. Such compositions are described, for example, in U.S. Pat. Nos. 4,486,504, issued Dec. 4, 1984, and 4,455,205, issued Jun. 19, 1984, and assigned to General Electric Company, Waterford, N.Y. These patents disclose radiation curable coating compositions prepared from the addition of a multifunctional acrylate monomer to a mixture of acryloxyfunctional silanes, and/or glycidoxy functional silanes and colloidal silica.

Until recently, silanes were thought to be necessary, but costly components of all abrasion resistant coating formulations. The use of silanes, however, has been eliminated where colloidal silica dispersed in an organic solvent is used. Japanese Kokai Patent No. Sho63[1988]-286409 issued Nov. 24, 1988, discloses a method for manufacturing a curable resin composition which contains an $\alpha$, $\beta$-unsaturated carboxylic acid compound and colloidal silica. These coatings, however, have one major drawback. They do not allow aqueous dispersions of colloidal silica to be used. Since aqueous colloidal silicas are, by far, the most common and readily available, a major segment of the colloidal silica market is excluded.

Thus, it would be highly desirable in both an economic and commercial sense if the relatively costly silanes could be eliminated from abrasion resistant coating formulations which contain aqueous dispersions of colloidal silica, while the abrasion resistance of such coating compositions, is maintained or improved.

It is important to note that U.S. Pat. No. 4,348,462, issued Sep. 7, 1982, and assigned to General Electric Company, Waterford, N.Y., states in the Background section of the specification, that, "[A]lthough it has been known that colloidal silica can be incorporated into heat cured coating systems, the present invention demonstrates for the first time that such colloidal silicas can be utilized to improve the abrasion resistance of ultraviolet light curable coatings. These results are accomplished through the specific combination of colloidal silica with acryloxy functional silanes or water miscible hydroxy acrylates, or preferably both, with catalytic amounts of UV sensitive photoinitiators".

No additional references are contained or implied in the aforementioned patent concerning the possibility of a coating composition containing only colloidal silica and water miscible hydroxy acrylates along with photoinitiators. To be anticipatory of a claimed invention, a reference must contain sufficient technical information to describe the claimed invention to a person of ordinary skill in the art to which the claimed invention pertains and to enable such a person to make and use the claimed subject matter, without first having to perform extensive experimentation or make an unobvious contribution. Thus, in the aforementioned patent, there is nothing that would teach how to make a silane free coating composition or even that a silane free abrasion resistant coating composition could exist at all. It is assumed, particularly in view of the fact that it took more than six years from the issuing date of the aforementioned patent, before any claims directed at a silane free abrasion resistant coating composition surfaced, (see Japanese Kokai Patent No. Sho63[1988]-286409 issued Nov. 24, 1988), that persons of ordinary skill in the art, after reading the questionable disclosure contained in U.S. Pat. No. 4,348,462, could not make a silane free abrasion resistant coating composition without first conducting extensive experimentation.

The present invention teaches not only that transparent, abrasion resistant coating compositions containing colloidal silica, water miscible hydroxy acrylates and multifunctional acrylates may be prepared, without the use of silanes, but that other specified organic compounds function in place of, or in conjunction with, water miscible hydroxy acrylates, such as water immiscible hydroxy acrylates and cyclic ethers.

SUMMARY OF THE INVENTION

Accordingly, it is one object of the present invention to provide a silane free abrasion resistant coating for solid substrates. Another object of the present invention is to provide a silane free abrasion resistant coating composition in which aqueous dispersions of colloidal silica may be used. Yet another object of this invention is to provide an electron beam or ultraviolet light radiation curable coating composition for solid substrates which, when applied to a substrate, provide an improved abrasion resistant surface thereon.

These and other objects are accomplished herein by a silane free radiation curable coating composition comprising:

(A) at least one multifunctional acrylate monomer;

(B) an organic compound selected from the group consisting of:

(i) hydroxy acrylate or mixture thereof, selected from the group consisting of

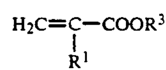

and

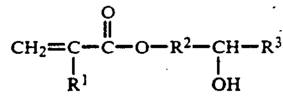

(ii) cyclic ether or mixtures thereof, having the general formula

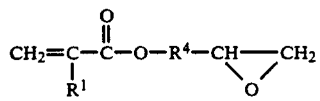

(iii) mixtures of (i) and (ii);

wherein:

$R^1$ is hydrogen or a monovalent hydrocarbon radical;

$R^2$ and $R^4$ are selected from an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents;

$R^3$ is selected from the group consisting of hydrogen, a monovalent hydrocarbon radical having from 1 to 6 carbon atoms, and a monovalent hydrocarbon radical having from 1 to 6 carbon atoms and containing at least one hydroxy group;

(C) aqueous dispersion of colloidal silica.

DETAILED DESCRIPTION OF THE INVENTION

Component (A) of this novel composition comprises at least one acrylate monomer which contains two or more functional groups selected from the group consisting of acryloxy and methacryloxy groups. These multifunctional acrylate monomers may be used singly or in combination with other multifunctional acrylate monomers. Some preferred multifunctional acrylate monomers useable as component (A) include: diacrylates of the formulas;

1,6-hexanediol diacrylate,
1,4-butanediol diacrylate,
ethylene glycol diacrylate,
diethylene glycol diacrylate,
tetraethylene glycol diacrylate,
tripropylene glycol diacrylate,
neopentyl glycol diacrylate,
1,4-butanediol dimethacrylate,
poly(butanediol) diacrylate,
tetraethylene glycol dimethacrylate,
1,3-butylene glycol diacrylate,
triethylene glycol diacrylate,
triisopropylene glycol diacrylate,
polyethylene glycol diacrylate,
bisphenol A dimethacrylate,
triacrylates of the formulas;
trimethylolpropane triacrylate,
trimethylolpropane trimethacrylate,
pentaerythritol monohydroxy triacrylate,
trimethylolpropane triethoxy triacrylate,
tetraacrylates of the formulas;
pentaerythritol tetraacrylate,
di-trimethylolpropane tetraacrylate,
pentaacrylates of the formulas;
dipentaerythritol (monohydroxy) pentaacrylate.

These multifunctional acrylate monomers are commercially available from Aldrich Chemical Company, Inc., Milwaukee, Wis.

The second component (B) of this composition comprises an organic compound selected from the group consisting of hydroxy acrylate, or mixture thereof, cyclic ether, or mixtures thereof, and any combination of the above organic compounds. The hydroxy acrylate, or mixtures therof, is selected from the group consisting of $$H_2C{=}C(R^1){-}COOR^3$$

and

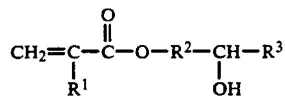

wherein:

$R^1$ is hydrogen or a monovalent hydrocarbon radical;

$R^2$ is selected from an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents;

$R^3$ is selected from the group consisting of hydrogen, a monovalent hydrocarbon radical having from 1 to 6 carbon atoms, and a monovalent hydrocarbon radical having from 1 to 6 carbon atoms and containing at least one hydroxy group. The exact nature of the organic portion of $R^2$ is not critical to the operability of this invention, but said organic portion must exclude functionality which would react with either the acryloxy or hydroxy functionality thereon. In other words, the organic portion of the $R^2$ group serves only as a structure to link the acryloxy functionality thereof with the hydroxy functionality thereof, and is preferably chemically inert. In this regard, the term "inert" defines structures which will not interfere with either the radiation curing of the acryloxy functional group or with the hydroxy functionality. Among the hydroxy acrylates which may be utilized in the present invention are:

acrylic acid
2-hydroxyethylacrylate
2-hydroxyethylmethacrylate
2-hydroxypropylacrylate
2-hydroxyethylmethacrylate
3-hydroxypropylacrylate
3-hydroxypropylcrotonate
3-hydroxypropylmethacrylate
5-hydroxypentylacrylate
2-hydroxy-3-methacryloxypropylacrylate
2-hydroxy-3-acryloxypropylacrylate
2-hydroxy-3-methacryloxypropylmethacrylate
2-hydroxyethyl 2-octenoate
2-hydroxyethyl 2-pentylacrylate.

These hydroxy acrylates are commercially available from Aldrich Chemical Company, Inc., Milwaukee, WI.

The second component (B) of this composition may also be a cyclic ether instead of a hydroxy acrylate, or it may be a mixture containing both organic compounds. The cyclic ether, and mixtures thereof, has the general formula

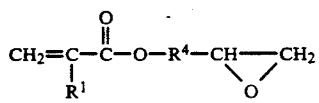

wherein:

$R^1$ is hydrogen or a monovalent hydrocarbon radical;

$R^4$ is selected from an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents. The exact nature of the organic portion of $R^4$ is not critical to the operability of this invention, but said organic portion must exclude functionality which would react with either the acryloxy or epoxy functionality thereon. In other words, the organic portion of the $R^4$ group serves only as a structure to link the acryloxy functionality thereof with the epoxy functionality thereof, and is preferably chemically inert. In this regard, the term "inert" defines structures which will not interfere with either the radiation curing of the acryloxy functional group or with the epoxy group. Among the cyclic either acrylates which may be utilized in the present invention are:

glycidylacrylate
glycidylmethacrylate
ethyleneglycolmonoacrylate
diethyleneglycoldiacrylate
triethyleneglycoldiacrylate
tetraethyleneglycoldiacrylate
trimethylolpropanetriacrylate
tetrahydroFurfurylmethacrylate
1-6-Hexanedioldiacrylate.

These cyclic ether compounds are commercially available from Aldrich Chemical Company, Inc., Milwaukee, WI.

The third component (C) of this composition comprises silica in the form of a colloidal dispersion. Colloidal silica is a dispersion of submicron-sized silica ($SiO_2$) particles in an aqueous or other solvent medium. The colloidal silicas used in this composition are dispersions of submicron size silica ($SiO_2$) particles in an aqueous or in a water/organic solvent mixture. Colloidal silica is available in acid or basic form. Either form may be utilized. An example of satisfactory colloidal silica for use in these coating compositions is Nalco 1034A colloidal silica (Nalco 1034A), Nalco 1129 colloidal silica (Nalco 1129), Nalco 2327 colloidal silica (Nalco 2327), Nalco 2326 collodial silica (Nalco 2326), and Nalco 1140 colloidal silica (Nalco 1140), which can be obtained from Nalco Chemical Company, Naperville, IL.

Nalco 1034A has a mean particle size of 20 nm and an $SiO_2$ content of approximately 34% by weight in water with a pH of approximately 3.1. Nalco 1129 has a mean particle size of 20 nm and an $SiO_2$ content of approximately 30% by weight in a solution of 40% isopropanol and 30% water. Nalco 2327 has a mean particle size of 20 nm and an $SiO_2$ content of approximately 40% by weight in water with a pH of approximately 9.3, and ammonium as the stabilizing ion. Nalco 2326 has a mean particle size of 5 nm and an $SiO_2$ content of approximately 14.5% by weight in water with a pH of approximately 9.0, and ammonium as the stabilizing ion. Nalco 1140 has a mean particle size of 15 nm and an $SiO_2$ content of approximately 40% by weight in water with a pH of approximately 9.7, and sodium as the stabilizing ion.

Other additives can be added to the compositions in order to enhance the usefulness of the coatings. For example, leveling agents, ultraviolet light absorbers, hindered amine light stabilizers (HALS), oxygen inhibitors, dyes and the like, can be included herein. All of these additives and the use thereof are well known in the art and do not require extensive discussions. Therefore, only a limited number will be referred to, it being understood that any of these compounds can be used so long as they do not deleteriously effect the radiation curing of the coating composition and do not adversely effect the transparency of the coating.

A particularly desirable additive has been found to be a small amount of a leveling agent. Leveling agents can be used on the substrates to cover surface irregularities and to aid in the uniform dispersion of the coating composition. These agents are especially useful in compositions where all the solvent has been removed. For purposes of the present invention, the addition of 0.01 to 5.0 percent commercial silicone glycol leveling agents, work well to provide the coating composition with desirable flowout and wetting properties.

Also useful as additives to the present coating compositions are UV absorbers and hindered amine light stabilizers. UV absorbers and hindered amine light stabilizers act to diminish the harmful effects of UV radiation on the final cured product and thereby enhance the weatherability, or resistance to cracking, yellowing and delamination of the coating. A preferred hindered amine light stabilizer is bis(1,2,2,6,6-pentamethyl-4-piperidinyl) [3,5-bis(1,1-dimethylethyl-4-hydroxyphenyl)methyl]butylpropanedioate, available as Tinuvin® 144, from CIBA-GEIGY Corporation, Hawthorne, NY.

For the purpose of the present compositions the 1 following UV absorbers and combinations thereof in concentrations of less than 20 weight percent based on the total composition, have been shown to produce desirable results: bis(1,2,2,6,6-pentamethyl-4-piperidinyl)(3,5-bis(1,1-dimethylethyl 1-4-hydroxyphenyl)methyl)butylpropanedioate, 2-ethylhexyl-2-cyano-3,3'-diphenylacrylate, 2-hydroxyl-4-n-octoxybenzophenone, 2-(2'-hydroxy-5'-methylphenyl)benzotriazole, poly(oxy-1,2-ethanediyl), alpha-(3-(3-(2H-benzotriazol-2-yl)-5-(1,1-dimethylethyl)-4-hydroxylphenyl)-1-oxopropyl)-omega-hydroxy, and Uvinul ® D-50 and MS-40, sold by BASF Wyandotte Inc., Parsippany, NJ. Concentrations of UV absorbers, however, in the range of 1 to 5 percent based on the total weight of the composition are preferred.

Incorporating UV absorbers into the instant compositions will permit the curing process regardless of whether UV or electron beam radiation is used to cure the composition. However, in the situation where UV radiation is to be used to cure the composition, the amount of UV absorbers added must be carefully controlled so as not to hinder the cure. This limitation does not exist in the case of electron beam radiation cure.

In the practice of the present invention, the radiation curable compositions can be made by combining the acrylate monomers and organic compounds with a given quantity of alcohol. Generally, the manner in which these components are mixed together is not important. A small amount of a carboxylic acid may, optionally, be added dropwise to the mixture. Suitable carboxylic acids include, for example, acetic acid, propionic acid and benzoic acid, etc.. The colloidal silica is then added while agitation is applied to the mixture. After allowing the mixture to stand for a period of time, the volatiles may optionally be removed under reduced pressure and/or the mixture may, be filtered.

According to the coating process of the present invention, the above described compositions are coated on a substrate using conventional coating techniques modified as appropriate to the particular substrate. For example, these compositions can be applied to a variety of solid substrates by methods such as roller coating, flow coating, dip coating, spin coating, spray coating and curtain coating. These various methods of coating allow the compositions to be placed on the substrate at variable thicknesses thus allowing a wider range of use of the compositions. Coating thicknesses may vary, but for improved abrasion resistance coating thicknesses of 2-25 microns, preferably about 5 microns, are recommended. The compositions are then cured by either ultraviolet or electron beam radiation.

The compositions may be ultraviolet light cured if one or more photoinitiators is added prior to curing. Oxygen inhibitors, which are materials used in conjunction with photoinitiators that increase their efficiency, may also be added. An example of a preferred oxygen inhibitor is 2-ethylhexyl-para-dimethylaminobenzoate, available as Uvatone® 8303, from The UpJohn Company, North Haven, CT.

There are no special restrictions on the radical-type photoinitiators as long as they can generate radicals by the absorption of optical energy. Ultraviolet light sensitive photoinitiators or blends of initiators which may be used in the UV cure of the present composition include 2-Hydroxy-2-methyl-1-phenyl-propan-1-one (Darocur® 1173), sold by EM Industries, Inc., Hawthorne, N.Y., and 2,2-Dimethoxy-2-phenyl-acetyl-phenone (Irgacure® 651), sold by Ciba-Geigy Corporation, Hawthorne, N.Y. In addition, cationic-type photoinitiators such as Cyracure® UVI 6974 or UVI 6990, sold by Union Carbide Corporation, Danbury, CT., may also be used in conjuction with the radical-type photoinitiators. For purposes of this invention, it has been found that from 0.05 to 5 weight percent based on the total solids in the composition, of the photoinitiators described herein will cause the composition to cure.

Alternatively, the coating composition may be electron beam radiation cured. Electron beam sources of various types such as van de Graaff-type, resonance transformer-type, linear-type, dynatron-type, and high frequency-type can be used as a source of electron beam. Electron beam having energy of from 50 to 1000 KeV, preferably from 100 to 300 KeV discharged therefrom, may be irradiated in a dose of from 0.1 to 10.0 Mega Rads (MR). A particularly preferred source of electron beam is one wherein a continuous curtain-like beam is irradiated from linear filaments. Examples of commercially available sources of electron beam are Electro Curtain CB-150 available from Energy Sciences Inc., and NP-ESH 150 available from Otto Durr.

The curable composition obtained in the process of the present invention is coated on the surface of a substrate (e.g., polycarbonate, etc.). After said composition has been ultraviolet light or electron beam treated, a cured coating film is formed.

By choice of the proper formulation and application conditions including the optional use of a leveling agent, the compositions can be applied and will adhere to substantially all solid substrates. Substrates which are especially contemplated herein are transparent and nontransparent plastics and metals. More particularly, these plastics are synthetic organic polymeric substrates such as acrylic polymers like poly(methylmethacrylate); polyesters, such as poly(ethlene terephthalate), poly (butylene terephthalate), etc.; polyamides; polyimides; acrylonitrile-styrene copolymers; styrene-acrylonitrile-butadiene copolymers; polyvinyl chloride; butyrates; polyethylene; polyolefins and the like including modifications thereof. The compositions of this invention are especially useful as transparent coatings for polycarbonates such as poly(bisphenol-A carbonate) and those polycarbonates known as Lexan®, sold by General Electric Company, Schenectady, N.Y.; and as coatings for acrylics such as polymethylmethacrylates. Metal substrates on which the present compositions are also effective include bright and dull metals like aluminum and bright metallized surfaces like sputtered chromium alloy. Other solid substrates contemplated herein include wood, painted surfaces, leather, glass, ceramics, textiles and paper.

The apparatus and testing procedures used for the results shown herein are as follows:

ABRASION TEST (TABOR TEST)

Abrasion resistance was determined according to ASTM Method D-1044. The instrument used was a Teledyne Taber model 503 Taber Abraser with two 250 gram auxiliary weights (500 gram load) for each of the CS10F abrasive wheels. The acrylic and polycarbonate test panels were subjected to 100 and 500 cycles on the abraser turntable. The percent change in haze which is the criterion for determining the abrasion resistance of the coating is determined by measuring the difference in haze of the unabrased and abrased coatings. Haze is defined as the percentage of transmitted light which, in passing through the sample, deviates from the incident beam by forward scattering. In this method, only light flux that deviates more than 2.5 degrees on the average is considered to be haze. The percent haze on the coatings was determined by ASTM Method D1003. A Gardner Haze Meter was used. The haze was calculated by measuring the amount of diffused light, dividing by the amount of transmitted light and multiplying by one hundred.

ADHESION TEST

Adhesion was measured by cross-hatch adhesion. A series of cross-hatch scribes are made in an area of one square inch with lines to form 1/10 inch squares. This surface is covered with 1.0 inch No. 600 Scotch Brand adhesive tape which is pressed down firmly over the cross-hatched area. The tape is withdrawn from the surface of the substrate with one rapid motion at about a 90° angle. This action of applying and removing the tape is carried out three times and then the substrate is observed. The number of squares remaining intact on the substrate are reported as a percentage of the total number of squares on the grid.

STEEL WOOL TEST

A two inch square of 0000 steel wool was applied over the face of a 24 oz. hammer and was secured with a rubber band. Coated sample blanks were tested for scratch resistance to 20 double rubs across the center of the sample with the weighted steel wool. The hammer is held by the end of its handle such that the majority of the pressure on the steel wool comes from the hammer head. The sample is graded according to the amount of scratching produced by the steel wool and hammer. The absence of scratches on the sample is graded a 1; slight scratching is graded a 2 and heavy scratching is graded a 3.

PENCIL TEST

This test is meant to be a qualitative method of determining scratch resistance of a coating. A coated panel is placed on a firm horizontal surface. A pencil is held firmly against the film at a 45° angle (point away from the operator) and pushed away from the operator in a ¼-in. (6.5-mm) stroke. The process is started with the hardest lead pencil and continued down the scale of hardness to the pencil that will not cut into or gouge the film. The hardest pencil that will not cut through the film to the substrate for a distance of at least ⅛ in. (3 mm) is reported according to the following scale from Berol Corporation, Brentwood, TN.:

6B, 5B, 4B, 3B, 2B, B, HB, F, H, 2H, 3H, 4H, 5H, 6H, 7H, 8H, 9H

The HB grade is approximately equal to that of a #2 pencil. The F grade is slightly harder and is the one most commonly used. The H grades are harder than that and get progressively harder up through the 9H grade which is very hard. The B grade is softer than the HB grade and get progressively softer through the 6B grade which is very soft.

In order that those skilled in the art may better understand how to practice the present invention, the following examples are given by way of illustration and not by way of limitation. All parts and percentages in the examples are on a weight basis.

EXAMPLE 1

A mixture of 1.73 g of glycidylacrylate, 4.50 g of trimethylolpropanetriacrylate and 51.46 g of isopropanol, was prepared. To this mixture was added 0.23 of glacial acetic acid. The mixture was then allowed to stand for five minutes. Next, 11.24 g of Nalco 1034A was added while the mixture underwent agitation. The mixture was then allowed to stand for 24 hours, before being filtered through a five micron filter. The filtered sample was flow coated onto a 4×4 polycarbonate panel and allowed to air dry for five minutes. The sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 2

A mixture of 1.89 g of glycidylmethacrylate, 4.34 g of trimethylolpropanetriacrylate and 51.46 g of isopropanol, was prepared. To this mixture was added 0.23 g of glacial acetic acid. The mixture was then allowed to stand for five minutes. Next, 11.24 g of Nalco 1034A was added while the mixture underwent agitation. The mixture was then allowed to stand for 24 hours, before being filtered through a five micron filter. The filtered sample was flow coated onto a 4×4 polycarbonate panel and allowed to air dry for five minutes. The sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 3

A mixture of 2.07 g of hydroxyethylacrylate, 4.16 g of trimethylolpropanetriacrylate and 51.46 g of isopropanol, was prepared. To this mixture was added 0.23 g of glacial acetic acid. The mixture was then allowed to stand for five minutes. Next, 11.24 g of Nalco 1034A was added while the mixture underwent agitation. The mixture was then allowed to stand for 24 hours, before being filtered through a five micron filter. The filtered sample was flow coated onto a 4×4 polycarbonate panel and allowed to air dry for five minutes. The sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 4

A mixture of 1.30 g of acrylic acid, 4.93 g of trimethylolpropanetriacrylate and 51.46 g of isopropanol, was prepared. To this mixture was added 0.23 g of glacial acetic acid. The mixture was then allowed to stand for five minutes. Next, 11.24 g of Nalco 1034A was added while the mixture underwent agitation. The mixture was then allowed to stand for 24 hours, before being filtered through a five micron filter. The filtered sample was flow coated onto a 4×4 polycarbonate panel and allowed to air dry for five minutes. The sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 5

A mixture of 2.07 g of hydroxyethylacrylate, 4.16 g of trimethylolpropanetriacrylate and 51.46 g of isopropanol, was prepared. This mixture was allowed to stand for five minutes. Next, 11.24 g of Nalco 1034A was added while the mixture underwent agitation. The mixture was then allowed to stand for 24 hours, before being filtered through a five micron filter. The filtered sample was flow coated onto a 4×4 polycarbonate panel and allowed to air dry for five minutes. The sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 6

A mixture of 2.07 g of hydroxyethylacrylate, 4.16 g of trimethylolpropanetriacrylate and 51.46 g of isopropanol, was prepared. This mixture was allowed to stand for five minutes. Next, 11.24 g of Nalco 1034A was added while the mixture underwent agitation. To 10.0 g of this mixture was added 0.11 g of 2-Hydroxy-2-methyl-1-phenyl-propan-1-one (Darocur® 1173), sold by EM Industries, Inc., Hawthorne, N.Y. This mixture was flow coated onto a 4×4 polycarbonate panel, which was allowed to air dry for 5 minutes. The coated polycarbonate sample was then UV cured by passing the sample through a medium pressure mercury vapor arc lamp with an average intensity of 91.56 mW/cm$^2$ at a line speed of three feet per minute. The test results are summarized in Table I.

EXAMPLE 7

A mixture of 2.07 g of hydroxyethylacrylate, 4.16 g of trimethylolpropanetriacrylate and 51.46 g of isopropanol, was prepared. This mixture was allowed to stand for five minutes. Next, 11.24 g of Nalco 1034A was added while the mixture underwent agitation. To 10.0 g of this mixture was added 0.11 g of 2-Hydroxy-2-methyl-1-phenyl-propan-1-one (Darocur® 1173), sold by EM Industries, Inc., Hawthorne, N.Y., and 0.02 g of 2-ethylhexyl-para-dimethylaminobenzoate, (Uvatone® 8303), from The UpJohn Company, North Haven, CT. This mixture was flow coated onto a 4×4 polycarbonate panel, which was allowed to air dry for 5 minutes. The coated polycarbonate sample was then UV cured by passing the sample through a medium pressure mercury vapor arc lamp with an average intensity of 91.56 mW/cm$^2$ at a line speed of three feet per minute. The test results are summarized in Table I.

EXAMPLE 8

A mixture of 2.07 g of hydroxyethylacrylate, 4.16 g of trimethylolpropanetriacrylate and 51.46 g of isopropanol, was prepared. This mixture was allowed to stand for five minutes. Next, 11.24 g of Nalco 1034A was added while the mixture underwent agitation. To 10.0 g of this mixture was added 0.04 g of Uvinol® D-50, sold by BASF Wyandotte Inc., Parsippany, NJ. and 0.03 g of Tinuvin® 144, from Ciba-Geigy Corporation, Hawthorne, NY. This mixture was flow coated onto a 4×4 polycarbonate panel, which was allowed to air dry for 5 minutes. The coated polycarbonate sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 9

A mixture of 2.07 g of hydroxyethylacrylate, 4.16 g of trimethylolpropanetriacrylate and 51.46 g of isopropanol, was prepared. This mixture was allowed to stand for five minutes. Next, 11.24 g of Nalco 1034A was added while the mixture underwent agitation. To 10.0 g of this mixture was added 0.04 g of Uvinul® MS-40, sold by BASF Wyandotte Inc., Parsippany, NJ. and 0.03 g of ®Tinuvin 144, from Ciba-Geigy Corporation, Hawthorne, NY. This mixture was flow coated onto a 4×4 polycarbonate panel, which was allowed to air dry for 5 minutes. The coated polycarbonate sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 10

A mixture of 2.07 g of hydroxyethylacrylate, 4.16 g of trimethylolpropanetriacrylate and 51.46 g of isopropanol, was prepared. This mixture was allowed to stand for five minutes. Next, 11.24 g of Nalco 1034A was added while the mixture underwent agitation. To 10.0 g of this mixture was added 0.04 g of bisphenol A dimethacrylate, sold by Aldrich Chemical Company, Inc., Milwaukee, WI. and 0.03 g of Tinuvin® 144, from Ciba-Geigy Corporation, Hawthorne, NY. This mixture was flow coated onto a 4×4 polycarbonate panel, which was allowed to air dry for 5 minutes. The coated polycarbonate sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 11

A mixture of 2.07 g of hydroxyethylacrylate, 4.16 g of trimethylolpropanetriacrylate and 25.23 g of isopropanol, was prepared. This mixture was allowed to stand for five minutes. Next, 12.73 g of Nalco 1129 was added while the mixture underwent agitation. The mixture was then allowed to stand for 24 hours, before being filtered through a five micron filter. The filtered sample was flow coated onto a 4×4 polycarbonate panel and allowed to air dry for 5 minutes. The coated polycarbonate sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

TABLE I

| | Properties of Coated Polycarbonate | | | | |
|---|---|---|---|---|---|
| Coating Compositions | ADHESION TEST | STEEL WOOL | PENCIL TEST | ABRASION TEST % $H_{100}$ | ABRASION TEST % H500 |
| Example 1 | 10% | 2 | B | 3.5 | 12.6 |
| Example 2 | 100% | 2 | B | 10.1 | 20.1 |
| Example 3 | 100% | 2 | F | 1.9 | 9.0 |
| Example 4 | 100% | 1 | F | 1.9 | 10.2 |
| Example 5 | 100% | 2 | HB | 1.8 | 7.4 |
| Example 6 | 100% | 1 | F | 0.2 | 4.7 |
| Example 7 | 100% | 2 | HB | 0.0 | 3.7 |
| Example 8 | 100% | 2 | HB | 3.7 | 11.3 |
| Example 9 | 100% | 2 | HB | 6.7 | 12.8 |
| Example 10 | 100% | 2 | HB | 3.2 | 10.0 |
| Example 11 | 100% | 2 | HB | 0.3 | 3.2 |

As the results in Table I clearly indicate, silane free, abrasion resistant coating compositions comprising multifunctional acrylates, specified organic compounds and aqueous colloidal silica may be easily manufactured. Furthermore, excellent results were obtained whether the coating compositions were cured by ultraviolet light or by electron beam radiation.

Many variations will suggest themselves to those skilled in this art in light of the above detailed description. All such obvious modifications are within the full intended scope of the appended claims.

What is claimed is:

1. A solid substrate having a coating formed on at least one portion of its surface, said coating being formed from the cured formulation consisting essentially of:

(A) at least one multifunctional acrylate monomer;

(B) an acrylic monomer selected from the group consisting of

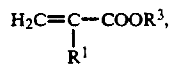

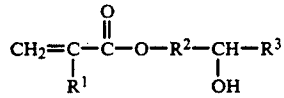

and

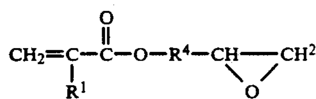

and mixtures thereof wherein:

$R^1$ is hydrogen or a monovalent hydrocarbon radical;

$R^2$ and $R^4$ are selected from an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents; and $R^3$ is selected from the group consisting of hydrogen, a monovalent hydrocarbon radical having from 1 to 6 carbon atoms and containing at least one hydroxy group; and (C) aqueous dispersion of colloidal silica.

2. A coated substrate in accordance with claim 1 wherein said substrate is transparent.

3. A coated substrate in accordance with claim 1 wherein said substrate is fabricated from an acrylic polymer.

4. A coated substrate in accordance with claim 1 wherein said substrate is fabricated from a polyester.

5. A coated substrate in accordance with claim 1 wherein said substrate is fabricated from a polycarbonate.

* * * * *